United States Patent Office 2,778,825
Patented Jan. 22, 1957

2,778,825

SUBSTITUTED N-CARBAMYL DERIVATIVES OF 2-METHYL-OXAZOLIDINES AND 2-METHYL-TETRAHYDRO-1,3-OXAZINES AND THEIR PREPARATION

Sidney Melamed, Philadelphia, Pa., assignor to Rohm & Haas Company, Philadelphia, Pa., a corporation of Delaware No Drawing. Application October 29, 1954, Serial No. 465,718

12 Claims. (Cl. 260—244)

The present invention is concerned with novel derivatives of 2-methyl oxazolidines and of 2-methyl-tetrahydro-1,3-oxazines, and more particularly substituted N-carbamyl derivatives thereof and to methods of producing them.

The new compounds of the invention have the structure of one of the Formulas I and II following:

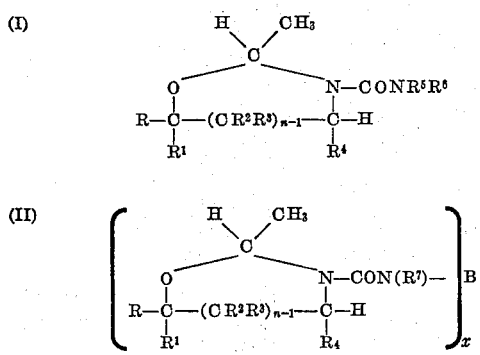

where $n$ is an integer having an value of 1 to 2, $x$ is an integer having a value of 2 to 3, R is hydrogen, an alkyl group of 1 to 16 carbon atoms, a cyclohexyl, or a vinyl group, $R^1$ is hydrogen or an alkyl group of 1 to 4 carbon atoms, $R^2$ is hydrogen or a methyl group, $R^3$ is hydrogen or a methyl group, $R^4$ is hydrogen or any alkyl group of 1 to 16 carbon atoms, $R^5$ is a saturated aliphatic or cycloaliphatic group of 1 to 24 carbon atoms, $R^6$ is a saturated aliphatic or cycloaliphatic group of 1 to 24 carbon atoms, and $R^5$ and $R^6$ together may form a saturated ring with the adjoining N, and $R^7$ is a saturated aliphatic or cycloaliphatic group of 1 to 24 carbon atoms, an aryl or aralkyl group containing a single benzene ring and when $x$ is 2 the two $R^7$ substituents may together constitute a —$C_2H_4$— linkage forming a piperazine ring with the —N—B—N— linkage, and B is a divalent or trivalent aliphatic or alicyclic hydrocarbon group of 2 to 18 carbon atoms, or a di- or tri-valent residue of benzene, of naphthalene, of diphenyl, of a diphenyl alkane, or of a triphenyl alkane. In the compounds of Formula II, any one or more or even all of the symbols R, $R^1$, $R^2$, $R^3$, $R^4$, and $R^7$ may be represented by the same, or by different or partly the same and partly different specific substituents in the several radicals constituting the parenthetical expression.

In the preferred compounds, $R^1$, $R^2$, and $R^3$ are hydrogen, R and $R^4$ are hydrogen or an alkyl group of 1 to 16 carbon atoms when $n$ is 1 but they are hydrogen when $n$ is 2, $R^7$ is methyl, phenyl, or benzyl, and B is a polymethylene group.

While 2-methyl-oxazolidine or 2-methyl-tetrahydro-1,3-oxazine, or their substituted derivatives can be reacted with a dialkyl carbamyl chloride of the formula III  $R^5R^6NCOCl$ or with a bis- or tris-carbamyl chloride of the formula:

IV  $B(-NR^7COCl)_x$ in which formulas the symbols have the same definitions as given above, with the production of the substituted N-carbamyl compounds of the invention, the yields are low of the order of 5 to 15%, apparently because of instability of the initial oxazolidines or tetrahydrooxazines and their tendency to tautomerize to corresponding Schiff bases as illustrated by the following equation which applies to the 2-methyl-oxazolidine itself:

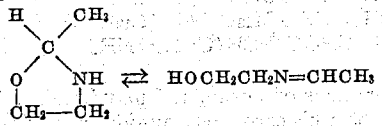

The present invention also provides a process for producing the new N-carbamyl derivatives in which the isolation and reaction with a 2-methyl-oxazolidine or a 2-methyl-tetrahydro-1,3-oxazine are avoided. This process produces the new compounds in high yields.

The compounds of Formula I may be produced by reacting a dialkyl carbamyl chloride of the formula III  $R^5R^6NCOCl$ with an amine of the formula V 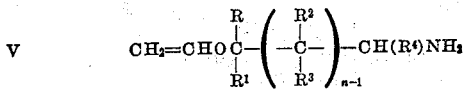

in which formulas the symbols have the definitions given above. It is a distinctive characteristic of the present invention that the new compounds are produced from amines which contain at least one hydrogen atom on a carbon atom attached directly to the nitrogen atom of the amine, and also that the new compounds have no hydrogen atoms attached directly to the nitrogens of the urea residue =N—CO—N=. The conditions of the reactions may vary widely. The temperature may be from —10° C. to 100° C., preferably —10° to 50° C. Reaction is preferably effected in the presence of a basic acceptor for the hydrogen chloride liberated, such as excess of the amine reactant, or an inorganic base, such as NaOH, KOH, LiOH, $Na_2CO_3$, $K_2CO_3$, etc. The reaction may be effected in an inert solvent, such as benzene, toluene, xylene, petroleum ether, or in a mixture of such a solvent with water.

It is surprising and unexpected that the new compounds of cyclic character are obtainable by this reaction and others described hereinbelow involving a linear amine.

Examples of the dialkyl carbamyl chlorides of Formula III that may be used are: dimethyl carbamyl chloride, diethyl carbamyl chloride, dipropyl carbamyl chloride, di-isopropyl carbamyl chloride, dibutyl carbamyl chloride, di-isobutyl carbamyl chloride, diamyl carbamyl chloride, dihexyl carbamyl chloride, dicyclohexyl carbamyl chloride, dioctyl carbamyl chloride, didecyl carbamyl chloride, didodecyl carbamyl chloride, dihexadecyl carbamyl chloride, dioctadecyl carbamyl chloride, ditetracosyl carbamyl chloride, methyl ethyl carbamyl chloride, methyl propyl carbamyl chloride, diallyl carbamyl chloride, tetramethylene carbamyl chloride, pentamethylene carbamyl chloride, the acid chloride of N-morpholine-carboxylic acid, N,N-di-10-undecenyl carbamyl chloride, methyl isopropyl carbamyl chloride, methyl butyl carbamyl chloride, methyl cyclohexyl carbamyl chloride, methyl octadecyl carbamyl chloride, ethyl isopropyl carbamyl chloride, ethyl octyl carbamyl chloride, ethyl hexadecyl carbamyl chloride, butyl octadecyl carbamyl chloride, hexyl octyl carbamyl chloride.

Representative amines of the Formula V are:

$CH_2=CHOCH_2CH_2NH_2$
$CH_2=CHOCH(CH_3)CH_2NH_2$
$CH_2=CHOCH_2CH(CH_3)NH_2$
$CH_2=CHOCH(CH_3)CH(CH_3)NH_2$
$CH_2=CHOCH(C_2H_5)CH_2NH_2$
$CH_2=CHOCH_2CH_2CH_2NH_2$
$CH_2=CHOC(CH_3)_2CH_2NH_2$
$CH_2=CHOC(CH_3)_2CH_2CH(CH_3)NH_2$
$CH_2=CHOCH_2C(CH_3)_2CH_2NH_2$
$CH_2=CHOCH(CH=CH_2)CH_2NH_2$
$CH_2=CHOCH(C_8H_{17})CH_2NH_2$
$CH_2=CHOCH(C_{12}H_{25})CH_2NH_2$
$CH_2=CHOCH(C_{16}H_{33})CH_2NH_2$
$CH_2=CHOCH_2CH(C_8H_{17})NH_2$
$CH_2=CHOCH_2CH_2CH(C_{12}H_{25})NH_2$
$CH_2CHOCH_2CH(C_{16}H_{33})NH_2$

The compounds of Formula II may be made by reacting a mole of a bis-carbamyl chloride or a tris-carbamyl chloride of the formula IV  $B(-NR^7COCl)_x$ in which the symbols have the same definition as given above, with two or three moles of a primary amine of Formula V above. The conditions are the same as those stated above for the reaction of the dialkyl carbamyl chlorides of Formula III with the amines of Formula V.

Examples of the carbamyl chlorides of Formula IV are:

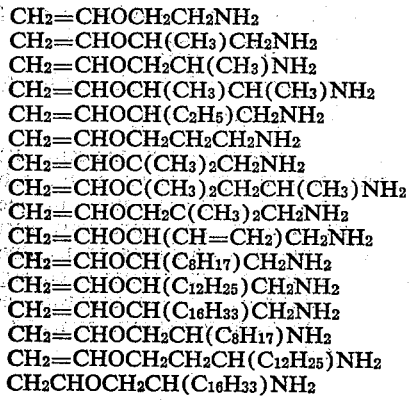

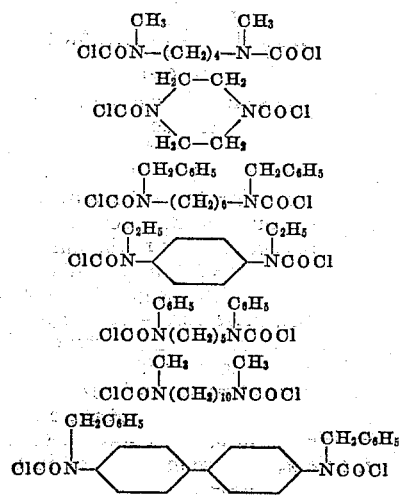

Tris-carbamyl chloride of 4,4',4" - tris(methylaminophenyl)methane bis-carbamyl chloride of 1,8-bis-(methylamino)naphthalene

(in which $C_6H_{11}$ is the cyclohexyl group).

Instead of the two or three moles of a single primary amine, there may be used instead a mixture of one mole each of two or three different amines or even mixtures of such amines in unequal proportions. In this manner, unsymmetrical compounds of Formula II may be produced in which the substituents R, $R^1$, $R^2$, $R^3$ and $R^4$ are different in one or more or all of the radicals in the parenthesis of Formula II.

An alternative method for producing the compounds of Formula II is to react one mole of a diamine or a triamine of the formula VI  $B(NR^7H)_x$ where the symbols are those defined above, with two to three moles of isocyanates of the formula

VII

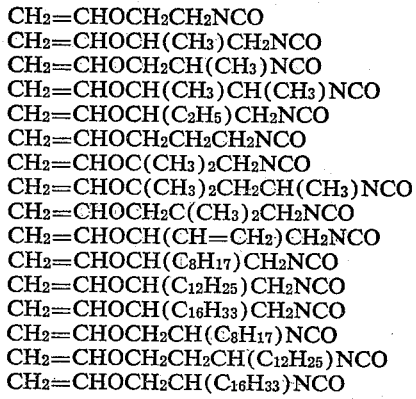

The reaction is effected at a temperature of —15° C. to 100° C., preferably —10° C. to 35° C. Inert solvents, such as benzene, toluene, xylene, and petroleum ether, may be used but are not necessary in all cases.

Examples of the polyamines of Formula VI include N,N'-dimethylethylene diamine, N,N'-dimethyltrimethylene diamine, N,N'-dimethylpropylene diamine, N,N'- diethylhexamethylene diamine, N,N'-dibutylpentamethylene diamine, N,N'-dibenzyldecamethylene diamine, 1,2,6-tris-(isobutylamino)hexane, N,N'-dibenzyl-paraphenylene diamine, piperazine, and N,N'-dibenzyl-methylene-bisparaphenylamine.

Examples of the isocyanates of Formula VII that may be used include:

$CH_2=CHOCH_2CH_2NCO$
$CH_2=CHOCH(CH_3)CH_2NCO$
$CH_2=CHOCH_2CH(CH_3)NCO$
$CH_2=CHOCH(CH_3)CH(CH_3)NCO$
$CH_2=CHOCH(C_2H_5)CH_2NCO$
$CH_2=CHOCH_2CH_2CH_2NCO$
$CH_2=CHOC(CH_3)_2CH_2NCO$
$CH_2=CHOC(CH_3)_2CH_2CH(CH_3)NCO$
$CH_2=CHOCH_2C(CH_3)_2CH_2NCO$
$CH_2=CHOCH(CH=CH_2)CH_2NCO$
$CH_2=CHOCH(C_8H_{17})CH_2NCO$
$CH_2=CHOCH(C_{12}H_{25})CH_2NCO$
$CH_2=CHOCH(C_{16}H_{33})CH_2NCO$
$CH_2=CHOCH(C_8H_{17})NCO$
$CH_2=CHOCH_2CH_2CH(C_{12}H_{25})NCO$
$CH_2=CHOCH_2CH(C_{16}H_{33})NCO$

The new compounds are useful as plasticizers or softeners for polymeric plastic compositions, including those of cellulose ethers and esters, such as cellulose acetate, cellulose acetatebutyrate, ethyl cellulose, benzyl cellulose, and cellulose nitrate, also those of polymerized monoethylenically unsaturated compounds, such as polyvinyl chloride, polyvinyl acetate, copolymers of vinyl chloride with vinyl acetate, vinylidene chloride, acrylonitrile or ethylene, polymers containing a predominant amount of acrylonitrile, such as 70 to 100% by weight thereof with the balance of one or more other monoethylenically unsaturated copolymerizable compounds, such as 2-vinyl-pyridine, 4-vinyl-pyridine, vinyl acetate, methacrylonitrile vinyl chloride, and so on. As plasticizers they are characterized by lack of migration or loss by syneresis over a wide range of temperatures normally occurring during use or storage of the plasticized polymers. They are compatible with the polymers up to 25 to 50% (on the weight of the polymer) depending on the particular compound and the particular polymeric substance.

The lower members of Formula I also have anti-convulsive properties and are of low oral toxicity. Certain compounds of the class exemplified by Formula I are also useful as non-phytotoxic, agricultural fungicides.

The following examples are illustrative of the invention.

*Example 1*

A solution of 69 g. (0.5 mole) of potassium carbonate in 150 ml. of water is made. Then 100 ml. of toluene and 43.5 g. (0.5 mole) of 2-aminoethyl vinyl ether are added and the mixture is stirred and cooled to about —4° C. to +4° C. There is then added gradually a dispersion of 53.5 g. (0.5 mole) of N,N-dimethylcarbamyl chloride in 50 ml. of toluene while maintaining the temperature between —4 and +4° C. When the reaction is complete the mixture is filtered and the layers are separated. The organic layer is dried with anhydrous magnesium sulfate, filtered, concentrated by stripping off the solvent under vacuum and then distilled to give 32 g. of a light, yellow oil, boiling point 89° C./1.5 mm. Hg containing 17.4% nitrogen and only 0.4% unsaturate by iodine titration. Infrared spectra indicates that this material contained no vinyl ether unsaturation. It is 2-methyl-3-dimethylcarbamyl-1,3-oxazolidine of the Formula IX IX 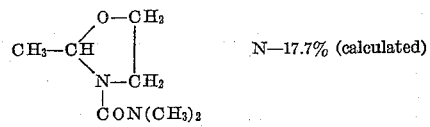   N—17.7% (calculated)

This compound has a low oral toxicity and a mild anticonvulsant character. It is useful as a plasticizer for a copolymer of 70 parts of acrylonitrile and 30 parts of ethyl acrylate when 20% is introduced on the weight of polymer.

This compound is also an active fungicide giving 100% inhibition of either Monilinia or Stemphylium organisms at concentrations of less than 1% and no evidence of phytotoxicity to tomato plants when tested at concentrations of 1%.

Example 2

The procedure of Example 1 is followed except that the ether and chloride are replaced by 0.5 mole each of $CH_2=CHOCH(C_8H_{17})CH_2NH_2$ and diethyl carbamyl chloride respectively and the temperature is maintained at 30° to 40° C. The product obtained, 2-methyl-3-diethylcarbamyl-5-octyl-1,3-oxazolidine, is a slightly yellow oil having a boiling point of about 100°–110° C./1.0 mm. Hg pressure. A polyvinyl chloride plasticized by 25% of the product is highly flexible.

Example 3

The procedure of Example 1 is followed except that the ether and chloride are replaced by 0.5 mole each of $CH_2=CHOCH_2CH(C_2H_5)NH_2$ and dibutyl carbamyl chloride respectively and the temperature is maintained at 30° to 40° C. The product obtained, 2-methyl-3-dibutylcarbamyl-4-ethyl-1,3-oxazolidine, is a slightly yellow oil having a boiling point of about 130°–140° C./0.5 mm. Hg pressure. A copolymer of 90% acrylonitrile and 10% vinyl chloride plasticized by 30% of this oxazolidine has good flexibility.

Example 4

The procedure of Example 1 is followed except that the ether and chloride are replaced by 0.5 mole each of $CH_2=CHO(CH_2)_3NH_2$ and dimethyl carbamyl chloride respectively and the temperature is maintained at 30° to 40° C. The 3-(N,N-dimethylcarbamyl)-2-methyl-tetrahydro-1,3-oxazine is obtained as a light yellow oil of boiling point about 100°–105° C./1.5 mm. Hg. It is an anti-convulsant and serves as a plasticizer for a copolymer of 85% acrylonitrile with 15% of styrene when incorporated in the copolymer in an amount from 15 to 35% by weight.

Example 5

The procedure of Example 1, up to but not including the distillation of the product, is followed except that the ether and chloride were replaced by 0.5 mole each of $CH_2=CHOCH_2C(CH_3)_2CH_2NH_2$ and dicyclohexyl carbamyl chloride respectively and the temperature was maintained at 50°–60° C. The yellow viscous oil product obtained consists essentially of 3-(N,N-dicyclohexylcarbamyl)-2-methyl-5,5-dimethyl-tetrahydro,3-oxazine. A copolymer of 90% vinyl chloride and 10% vinyl acetate is plasticized to a highly flexible condition by 15 to 20% by weight of the product.

Example 6

(a) The procedure of Example 1 is followed except that the ether and chloride are replaced by 0.5 mole each of $CH_2=CHOCH(CH_3)CH(CH_3)NH_2$ and N,N-pentamethylene carbamyl chloride respectively and the temperature is maintained at 30° to 40° C. The product, 2,4,5-trimethyl-3-(N,N-pentamethylene carbamyl)-1,3-oxazolidine, is an oil distilling at about 120–125° C./0.7 mm. Hg. It is a mild, non-toxic anti-convulsant.

(b) The procedure of Example 1 is followed except that the ether and chloride are replaced by 0.5 mole each of $CH_2=CHOCH(CH_3)CH(CH_3)NH_2$ and N,N-tetramethylene carbamyl chloride respectively and the temperature is maintained at 30° to 40° C. The product, 2,4,5-trimethyl-3-(N,N-tetramethylene carbamyl)-1,3-oxazolidine, is an oil similar to that obtained in part (a) hereof.

Example 7

A solution of 69 g. of potassium carbonate in 150 ml. of water is made. Then 200 ml. of toluene and 87 g. (1 mole) of 2-aminoethyl vinyl ether are added and the mixture is stirred and cooled to about 30° C. to 40° C. Then there is gradually added a solution of 0.5 mole of N,N'-dimethyl-hexamethylene-bis-carbamyl chloride in 50 ml. of toluene while maintaining the temperature between 30° C. and 40° C. After the completion of the reaction (about 4 hours), the mixture is filtered and the layers are separated. The organic layer is dehydrated with anhydrous magnesium sulfate, filtered, and is then stripped of solvent under vacuum. The resulting product is an oil consisting essentially of a compound of the Formula X:

X 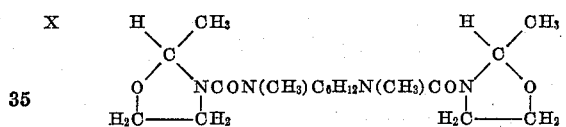

A copolymer of 70% of acrylonitrile and 30% of vinyl acetate is compounded with 20% of the oily product to produce a flexible thermoplastic molding composition.

Example 8

The procedure of Example 7 was followed except that the ether and chloride were replaced with 1 mole of 3-aminopropyl vinyl ether and 0.5 mole of the bis-carbamyl chloride of piperazine. The product was a viscous oil substantially of the composition of the Formula XI:

XI 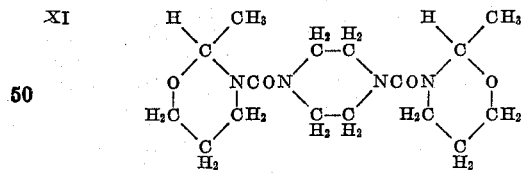

It similarly served as a plasticizer for a copolymer of acrylonitrile.

Example 9

The procedure of Example 7 was followed except that the ether and chloride were replaced with 1 mole of $CH_2=CHOCH(C_{16}H_{33})CH_2NH_2$ and ½ mole of N,N'-dimethyl-4,4'-diphenylene-bis-carbamyl chloride and the reaction was effected for eight hours at 60°–70° C. The product consisted essentially of a compound of the Formula XII:

XII 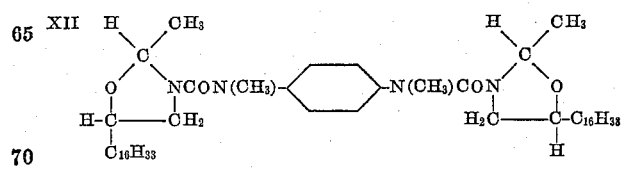

The product serves as a plasticizer for vinyl resins, such as polyvinyl chloride.

Example 10

The procedure of Example 7 was followed except that the ether and chloride were replaced with 1 mole of $CH_2=CHOCH(C_6H_{11})CH_2NH_2$ and 0.5 mole of N,N'-dibenzyldecamethylene-bis-carbamyl chloride and the reaction was effected for eight hours at 60° to 70° C. The product obtained corresponded in analysis to a compound of the structure:

XIII

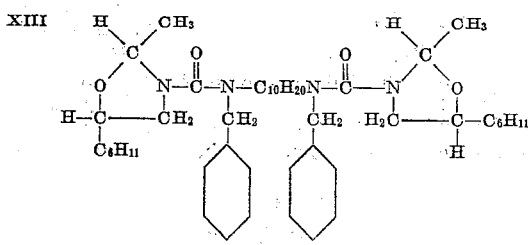

Example 11

The procedure of Example 2 is followed except that the ether and chloride are replaced by 0.5 mole each of $CH_2=CHOCH(CH_2=CH)CH_2NH_2$ and dimethyl carbamyl chloride. The reaction was complete in about 4 hours. The product, 2-methyl-3-(N,N-dimethylcarbamyl)-5-vinyl-1,3-oxazolidine, is a yellow oil boiling in the range of 110°–120° C. at 1.5 mm. Hg.

Example 12

(a) The procedure of Example 1 is followed except that the ether and chloride are replaced by 0.5 mole each of 2-aminoethyl vinyl ether and didodecylcarbamyl chloride and the temperature is maintained at 80° to 100° C. The reaction is substantially complete after 8 hours. The product, 3-(N,N-didodecylcarbamyl)-2-methyl-1,3-oxazolidine, is a yellowish waxy solid.

(b) Reaction under the same conditions in part (a) of 2-aminoethyl vinyl ether and dioctadecylcarbamyl chloride produced a similar waxy solid.

The compounds of this invention are characterized by several structural features which contribute either to their utility and performance or are requisite for stability in preparation or isolation. Thus the compounds each have a 2-methyl substituent and at least one hydrogen on carbon four in the heterocyclic portion of the molecule, namely the oxazolidine or tetrahydrooxazine portion. In addition, the compounds are distinguished by the lack of hydrogens on the urea nitrogens, namely the nitrogens of the heterocyclic groups just mentioned and the connected 3-carbamide groups.

The heterocyclic oxazolidine or tetrahydrooxazine group or groups common to all of the compounds of this invention contribute important and unexpected properties thereto. For example, they impart reactivity to these compounds for other reactive materials such as ureas, aldehydes, melamines, epoxides and the like, particularly in the presence of acid or acidic-type catalysts. Reaction with these compounds may sometimes involve opening of the ring or rings of the compounds of the invention. The heterocyclic nature of the compounds contributes to the useful physiological or pesticidal activity of numerous of the compounds of the invention. Additionally the heterocyclic groups impart particular and unpredictable solubility relationships contributing to compatibility in applications involving plasticization or compounding of resins, oils, and the like. The heterocyclic nature of the compounds is important in other ways but obviously forms an integral and indispensable part of the invention.

It is to be understood that changes and variations may be made without departing from the spirit and scope of the invention as defined in the appended claims.

I claim:

1. As a new composition of matter, a compound selected from the group consisting of those having the structure of one of Formulas I and II:

I
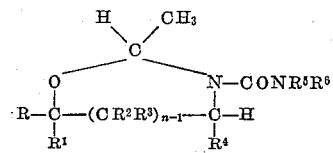

II
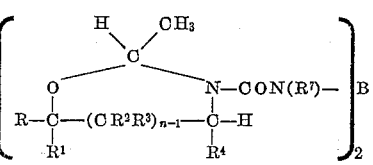

where $n$ is an integer having a value of 1 to 2, R is selected from the group consisting of hydrogen, cyclohexyl, vinyl, and alkyl groups having 1 to 16 carbon atoms, $R^1$ is selected from the group consisting of hydrogen and alkyl groups having 1 to 4 carbon atoms, $R^2$ is selected from the group consisting of hydrogen and methyl, $R^3$ is selected from the group consisting of hydrogen and methyl, $R^4$ is selected from the group consisting of hydrogen and alkyl groups having 1 to 16 carbon atoms, $R^5$ when not directly connected to $R^6$ to form a ring is selected from the group consisting of saturated aliphatic and cycloaliphatic groups having 1 to 24 carbon atoms, $R^6$ when not directly connected to $R^5$ to form a ring is selected from the group consisting of saturated aliphatic and cycloaliphatic groups having 1 to 24 carbon atoms, $R^5$ and $R^6$, when directly connected together, consist of an aliphatic hydrocarbon radical and form a saturated 5- to 6-membered ring with the adjoining N atom, $R^7$, when it is a monovalent group, is a hydrocarbon group having 1 to 7 carbon atoms, but when the two $R^7$ substituents are directly connected together, they constitute a —$C_2H_4$— linkage forming a piperazine ring with the —N—B—N— linkage, and B is selected from the group consisting of divalent aliphatic hydrocarbon groups having 2 to 18 carbon atoms, and divalent residues of benzene.

2. A process comprising reacting an amine having the structure of Formula V:

V
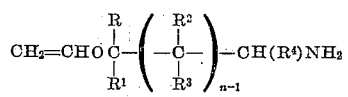

with a carbamyl chloride selected from the group consisting of those having the structure of one of Formulas III and IV:

III 

IV 

the symbols of Formulas III, IV, and V being as defined in claim 1, and recovering a compound selected from the group consisting of those having the structure of one of Formulas I and II as defined in claim 1.

3. A process as defined in claim 2 in which the reaction is effected at a temperature from —10° C. to 100° C. in the presence of a basic material for accepting the hydrogen chloride liberated.

4. As a new compound, a 2-methyl-3-(N,N-dialkylcarbamyl)-1,3-oxazolidine in which the alkyl group has 1 to 24 carbon atoms.

5. As a new compound, a 2-methyl-3-(N,N-dialkylcarbamyl)-tetrahydro-1,3-oxazine in which the alkyl group has 1 to 24 carbon atoms.

6. As a new composition of matter, a compound having the structure

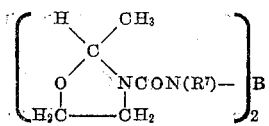

where $R^7$ is an aliphatic group having 1 to 24 carbon atoms, and B is a divalent aliphatic hydrocarbon group having 2 to 18 carbon atoms.

7. As a new composition of matter, a compound having the structure

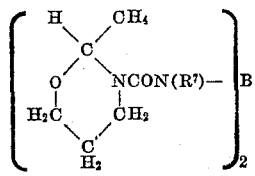

where $R^7$ is an aliphatic group having 1 to 24 carbon atoms, and B is a divalent aliphatic hydrocarbon group having 2 to 18 carbon atoms.

8. As a new compound, 2-methyl-3-(N,N-dimethylcarbamyl)-1,3-oxazolidine.

9. As a new compound, 2-methyl-3-(N,N-dimethylcarbamyl)-tetrahydro-1,3-oxazine.

10. As a new compound, 2-methyl-3-(N,N-didodecylcarbamyl)-1,3-oxazolidine.

11. As a new composition of matter, a compound of the formula

X
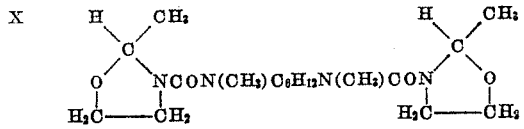

12. As a new composition of matter, a compound of the formula

XI
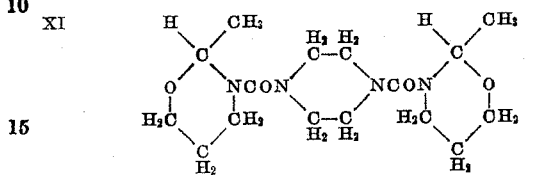

References Cited in the file of this patent

FOREIGN PATENTS 221,827    Switzerland _____ Sept. 1, 1942

OTHER REFERENCES

Henry et al., J. A. C. S., vol. 71, pp. 2297–2300 (1949).